United States Patent [19]

Doswald et al.

[11] Patent Number: 5,227,476
[45] Date of Patent: Jul. 13, 1993

[54] 2-(3,6,8-TRISULFONAPHTH-2-YLAZO)-5-[2-CHLORO-4-[2-(5-CHLORO-2,4-DIFLUOROPYRIMID-6-YLAMINO)-2-METHYL-ETHYL]AMINO-1,3,5-TRIAZIN-6-YLAMINO]PHENYL UREA SALTS THEREOF

[75] Inventors: Paul Doswald, Münchenstein; Werner Koch, Oberwil, both of Switzerland

[73] Assignee: Sandoz Ltd., Basel, Switzerland

[21] Appl. No.: 570,941

[22] Filed: Aug. 21, 1990

Related U.S. Application Data

[63] Continuation of Ser. No. 438,929, Nov. 17, 1989, abandoned, which is a continuation of Ser. No. 144,882, Jan. 13, 1988, abandoned.

[30] Foreign Application Priority Data

Jan. 14, 1987 [DE] Fed. Rep. of Germany ....... 3700846

[51] Int. Cl.$^5$ .................. C06B 62/245; C06B 62/085; D09P 1/382
[52] U.S. Cl. ................. 534/634; 534/573; 534/598
[58] Field of Search ................. 534/638, 634

[56] References Cited

U.S. PATENT DOCUMENTS

| | | | |
|---|---|---|---|
| 3,362,948 | 1/1968 | Andrew et al. | 534/638 |
| 4,248,771 | 2/1981 | Scholl et al. | 534/638 X |
| 4,507,236 | 3/1985 | Seiler et al. | 538/634 |

FOREIGN PATENT DOCUMENTS

| | | | |
|---|---|---|---|
| 0013996 | 8/1980 | European Pat. Off. | 534/638 |
| 0097119 | 12/1983 | European Pat. Off. | 534/638 |
| 86-04080 | 7/1986 | PCT Int'l Appl. | 534/638 |
| 1015931 | 1/1966 | United Kingdom | 534/638 |
| 1530104 | 10/1978 | United Kingdom | 534/638 |
| 2169306 | 7/1986 | United Kingdom | 534/638 |

*Primary Examiner*—Mary C. Lee
*Assistant Examiner*—Fiona T. Powers
*Attorney, Agent, or Firm*—Robert S. Honor; Melvyn M. Kassenoff

[57] ABSTRACT

Compounds of the formula

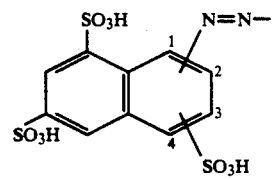

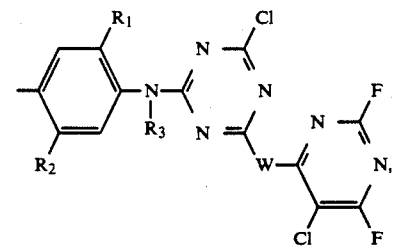

and salts thereof, wherein $R_1$ is hydrogen, $C_{1-4}$alkyl or $C_{1-4}$alkoxy,
$R_2$ is hydrogen, halo, $C_{1-4}$alkyl, $C_{1-4}$alkoxy, ($C_{1-4}$alkyl)-carbonylamino or —NHCONH$_2$, and
W is -NR$_3$-B$_1$-NR$_3$-,

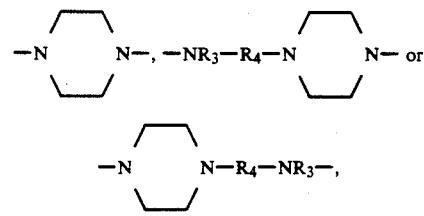

wherein
$B_1$ is linear or branched $C_{2-6}$alkylene, linear or branched $C_{2-6}$alkylene interrupted by —O— or —NR$_3$— or linear or branched $C_{3-6}$alkylene monosubstituted or disubstituted by hydroxy, with the proviso that the hydroxy groups of any linear or branched $C_{3-6}$alkylene disubstituted by hydroxy are bound to different carbon atoms, and
$R_4$ is linear or branched $C_{2-4}$alkylene,
wherein
each $R_3$ is independently hydrogen, $C_{1-4}$alkyl or $C_{1-4}$alkyl substituted by hydroxy, halo, cyano, sulfo, sulfato or carboxy, with the provisos that the —N=N— radical is attached to the 1- or 2-position of the naphthalene ring and the floating sulfo group is attached to the 3- or 4-position of the naphthalene ring, and mixtures thereof, are useful for dyeing and printing hydroxy group- or nitrogen-containing organic substrates, for example leather and fiber materials containing or consisting of natural or synthetic polyamides or natural or regenerated cellulose, especially textile material containing or consisting of cotton.

2 Claims, No Drawings

2-(3,6,8-TRISULFONAPHTH-2-YLAZO)-5-[2-CHLORO-4-[2-(5-CHLORO-2,4-DIFLUOROPYRIMID-6-YLAMINO)-2-METHYL-ETHYL]AMINO-1,3,5-TRIAZIN-6-YLAMINO]PHENYL UREA SALTS THEREOF

This is a continuation of application Ser. No. 07/438,929, filed Nov. 17, 1989 and now abandoned, which is a continuation of application Ser. No. 07/144,882, filed Jan. 13, 1988 and now abandoned.

This invention relates to monoazo compounds containing a heterocyclic fibre-reactive group and to a process for their preparation. These compounds are suitable for use as fibre-reactive dye-stuffs.

More particularly, this invention provides compounds of formula I

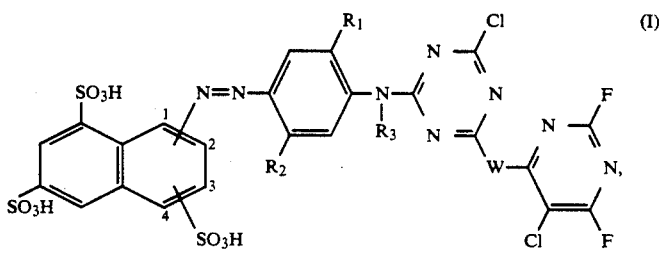

in free acid or salt form, in which
the azo group is in the 1- or 2-position, and
the sulpho group is in the 3- or 4-position of the naphthalene ring,
$R_1$ is hydrogen, $C_{1-4}$alkyl or $C_{1-4}$alkoxy,
$R_2$ is hydrogen, halogen, $C_{1-4}$alkyl, $C_{1-4}$alkoxy, —NHCOC$_{1-4}$alkyl or —NHCONH$_2$,
W is

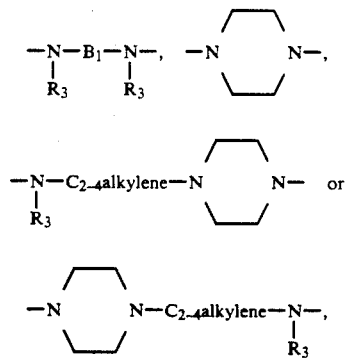

$B_1$ is $C_{2-6}$alkylene, a $C_{2-6}$alkylene chain which is interrupted by —O— or —NR$_3$—, or monohydroxy- or dihydroxy-substituted $C_{3-6}$alkylene, and
each $R_3$ is independently hydrogen, unsubstituted $C_{1-4}$alkyl or $C_{1-4}$-alkyl substituted by hydroxy, halogen, cyano, —SO$_3$H, —OSO$_3$H or —COOH,
and mixtures of compounds of formula I.

When the naphthalenic diazo component is derived from 1-aminonaphthalene, the sulpho group is preferably in the 3-position.

Preferably, the azo radical is in the 2-position of the naphthalene ring; more preferably, the diazo component is 2-aminonaphthalene-3,6,8-or -4,6,8-trisulphonic acid. Even more preferably, it is 2-aminonaphthalene-3,6,8-trisulphonic acid.

In the specification, any alkyl or alkylene group present is linear or branched unless indicated otherwise. In any hydroxy-substituted alkyl or alkylene group which is attached to a nitrogen atom, the hydroxy group is preferably bound to a carbon atom which is not directly attached to the nitrogen atom. In any alkylene group containing two hydroxy groups, the hydroxy groups are bound to different carbon atoms which are preferably not adjacent to each other.

Any alkyl or alkoxy as $R_1$ and $R_2$ preferably contains 1 or 2 carbon atoms and is most preferably methyl or methoxy.

Any halogen as $R_2$ is preferably chlorine or bromine, especially chlorine. Any —NHCOC$_{1-4}$alkyl is most preferably an acetamido group.

$R_1$ is preferably $R_{1a}$, where $R_{1a}$ is hydrogen, methyl or methoxy. More preferably it is $R_{1b}$, where $R_{1b}$ is hydrogen or methoxy. Most preferably $R_1$ is hydrogen.

$R_2$ is preferably $R_{2a}$, where $R_{2a}$ is hydrogen, chlorine, methyl, methoxy, —NHCOCH$_3$ or —NHCONH$_2$. More preferably, $R_2$ is $R_{2b}$, where $R_{2b}$ is hydrogen, methyl, —NHCOCH$_3$ or —NHCONH$_2$. Most preferably, $R_2$ is —NHCONH$_2$.

Any alkyl as $R_3$ has preferably 1 or 2 carbon atoms. Any substituted alkyl as $R_3$ is preferably a $C_{1-3}$alkyl group containing one substituent preferably selected from hydroxy, chlorine, cyano, —SO$_3$H, —OSO$_3$H and —COOH, of which hydroxy is the particularly preferred substituent.

Each $R_3$ is preferably $R_{3a}$, where each $R_{3a}$ is independently hydrogen, methyl, ethyl, 2-hydroxyethyl, —(CH$_2$)$_m$SO$_3$H, —(CH$_2$)$_m$OSO$_3$H or —(CH$_2$)$_n$COOH, in which m is 1 or 2 and n is 1, 2 or 3. More preferably, each $R_3$ is $R_{3b}$, where each $R_{3b}$ is independently hydrogen, methyl, ethyl or 2-hydroxyethyl. Most preferably each $R_3$ is hydrogen.

The bridging group $B_1$ is preferably $B_{1a}$, where $B_{1a}$ is —C$_{2-4}$alkylene—, —C$_{2-3}$alkylene—O—C$_{2-3}$alkylene—, —C$_{2-3}$alkylene—

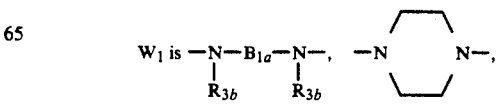

or monohydroxy substituted —C$_{3-4}$alkylene—. More preferably it is $B_{1b}$, where $B_{1b}$ is —C$_{2-3}$alkylene— or monohydroxy substituted —C$_{3-4}$alkylene—.

W is preferably W$_1$, where $$W_1 \text{ is } \underset{R_{3b}}{-N}-B_{1a}-\underset{R_{3b}}{N}-, \quad -N\diagup\!\!\!\diagdown N-,$$

-continued

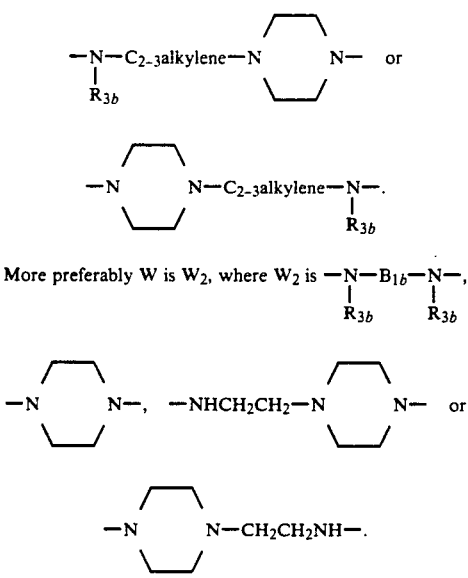

More preferably W is $W_2$, where $W_2$ is

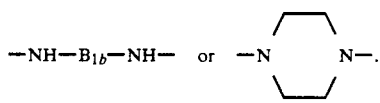

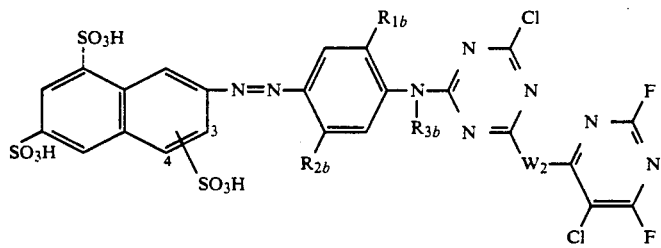

Even more preferably W is $W_3$, where $W_3$ is

—NH—$B_{1b}$—NH—  or  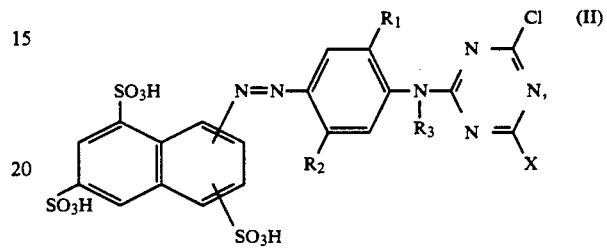.

Most preferably W is $W_4$, where $W_4$ is —NH—$B_{1b}$—NH—.

Preferred compounds correspond to formula Ia,

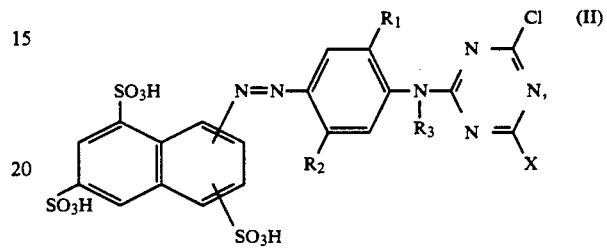

which compounds are in free acid or salt form, in which the sulphonic acid group is in the 3- or 4-position of the naphthalene ring.

The floating Sulpho group in formula Ia is preferably in the 3-position of the naphthalene ring.

More preferred are compounds of formula Ia in which
(1) $R_{1b}$ is hydrogen;
(2) those of (1), in which $R_{2b}$ is —NHCONH$_2$;
(3) each $R_{3b}$ is hydrogen;
(4) those of (1) to (3), in which $W_2$ is $W_3$;
(5) those of (4), in which $W_2$ is $W_4$;
(6) those of (1) to (5) in which the sulphonic acid group is in the 3-position of the naphthalene ring.

When a compound of formula I is in salt form, the cation associated with the sulpho groups and any carboxy group is not critical and may be any one of those non-chromophoric cations conventional in the field of fiber-reactive dyes provided that the corresponding salts are water-soluble. Examples of such cations are alkali metal cations and unsubstituted and substituted ammonium cations, e.g., lithium, sodium, potassium, ammonium, mono-, di-, tri-and tetra-methylammonium, triethylammonium and mono-, di- and tri-ethanolammonium.

The preferred cations are the alkali metal cations and ammonium, with sodium being the most preferred.

In a compound of formula I the cations of the sulpho and any carboxy groups can be the same or different, e.g., they can also be a mixture of the above mentioned cations meaning that the compound of formula I can be in a mixed salt form.

The present invention further provides a process for the preparation of compounds of formula I and mixtures thereof comprising reacting a compound of formula II

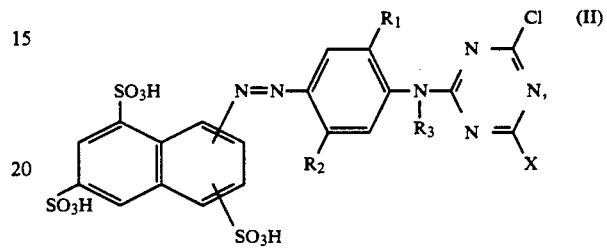

which compound is in free acid or salt form, in which X is —W—H or chlorine, if X is —W—H, with 5-chloro-2,4,6-trifluoropyrimidine, or, if X is chlorine, with a compound of formula III

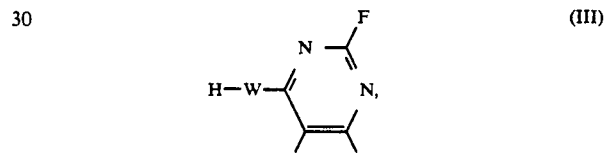

using a 1:1 molar ratio of the compounds of formulae II and III.

The condensation reactions may be effected in accordance with conventional methods.

The compounds of formula I may be isolated in accordance with known methods, for example, by conventional salting out with alkali metal salt, filtering and drying optionally in vacuo.

Depending on the reaction and isolation conditions a compound of formula I is obtained in free acid or preferably salt form or even mixed salt form containing, for example, one or more of the above-mentioned cations. It may be converted from free acid form to a salt form or mixture of salt forms or vice versa or from one salt form to another by conventional means.

The starting compounds of formula II may be prepared by reacting a compound of formula IV

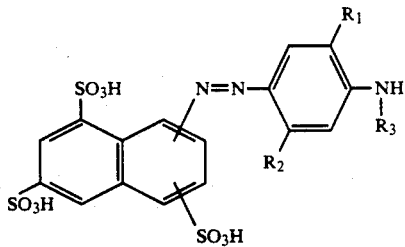

which compound is in free acid or salt form, with cyanuric chloride using a molar ratio of 1:1, and optionally subsequently replacing of one chlorine atom by reacting with a diamine H—W—H.

The different condensation reactions to replace a chlorine atom on the triazine ring may be carried out in accordance with known methods.

The compounds of formulae III and IV as well as the diamines of the formula H—W—H are either known or may be prepared in accordance with known methods using known starting material.

The compounds of formula I and mixtures thereof are useful as fibre-reactive dyestuffs for dyeing or printing hydroxy group- or nitrogen-containing organic substrates. Preferred substrates are leather and fibre material containing or consisting of natural or synthetic polyamides and, particularly, of natural or regenerated cellulose such as cotton, viscose and spun rayon. The most preferred substrate is textile material containing or consisting of cotton.

Dyeing or printing is effected in accordance with known methods conventional in the fibre-reactive dyestuff field. The most favorable and therefore preferred dyeing temperatures are within the range of 30° to 60° C. Furthermore, the compounds of formula I are particularly suited for African print, where cotton primed with naphthol AS dyes is used for printing.

The compounds of this invention are well compatible with other fibre-reactive dyes; they may be applied per se or in combination with appropriate fibre-reactive dyestuffs of the same class having analogous dyeing properties, e.g., concerning common fastness properties, extent of ability to exhaust from the dyebath onto the fibre, etc. The dyeings obtained with such combination mixtures have good fastness properties and are comparable to those obtained with a single dyestuff.

In view of their notable build-up power the compounds of formula I give high exhaust and fixation yield. The portion of unfixed dyestuff can be easily washed off the substrate. The dyeings and prints obtained and especially those prints obtained from combination with naphthol AS dyes show not only notably good dry and wet light fastness of which the latter is particularly remarkable, but also good wet fastness properties such as wash, water, sea water and sweat fastness. They are stable to oxidative influences, e.g., chlorinated water, hypochlorite bleach and peroxide- or perborate containing wash liquors.

The following examples further serve to illustrate the invention. In the examples all parts and percentages are by weight or volume. The temperatures are in degrees Centigrade.

EXAMPLE 1 a) 9.6 Parts of 2-aminonaphthalene-3,6,8-trisulphonic acid are dissolved in 60 parts of water at pH 12 by the addition of 4.3 parts of 30% sodium hydroxide solution. To this solution, 11 parts of 30% hydrochloric acid are added dropwise and a suspension is obtained, which is well stirred. Diazotisation is effected at 0°–5° after the addition of 25 parts ice by adding 6.5 parts of 4N sodium nitrite solution. This diazonium salt solution is added to a suspension consisting of 3.9 parts of 3-aminophenylurea in 25 parts of ice water at 3°–7° within 30 minutes. During the addition, the pH is kept at 5.0 by adding 22 parts of 20% sodium carbonate solution. A red solution is formed containing the aminoazo compound of formula A.

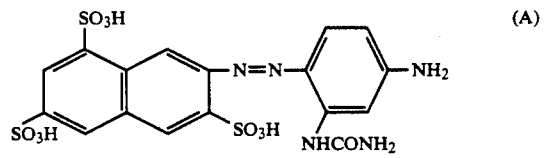

b) 5.1 Parts of cyanuric chloride are stirred into 30 parts of ice water during 30 minutes. Subsequently, the dye solution obtained in step a) is added within 5 minutes, and condensation is effected at pH 6.0 in the presence of 8 parts of 20% sodium carbonate solution. To the red-orange solution thus obtained, a solution is added containing 4 parts of 1,3-diamino-2-propanol in 50 parts of ice water, the pH of which has been adjusted to 6.0 by adding 8 parts of 30% hydrochloric acid. Within 8 hours the temperature of the reaction mixture is slowly elevated to 45°. Simultaneously, the pH of the mixture is kept at 6.0 by the addition of 20 parts of 20% sodium carbonate solution. Before separating the orange dyestuff thus formed, its precipitation is completed by adding 100 parts of sodium chloride. The compound of formula B

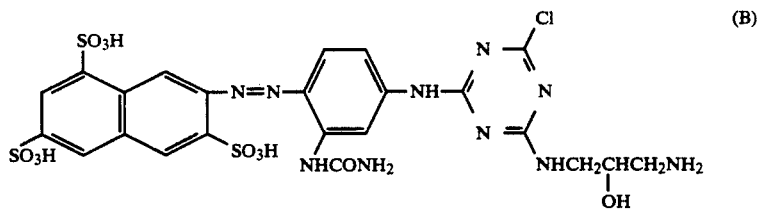

is obtained.

c) 39.8 Parts of the compound of formula B, in form of a paste containing 30% dyestuff, are suspended in 300 parts water. The pH of the mixture is adjusted to 9.0 by adding 1.0 part of 10% sodium hydroxide solution. Within one hour at 20°–25°, 1.0 part of 5-chloro-2,4,6-trifluoropyrimidine is uniformly added dropwise, whilst keeping the pH at 9.0 by adding 11 parts of sodium hydroxide solution. The obtained dull solution is filtered clear. To the filtrate 70 parts of sodium chloride are added, and the dyestuff which precipitates is then filtered and dried in vacuo. The dyestuff having the formula

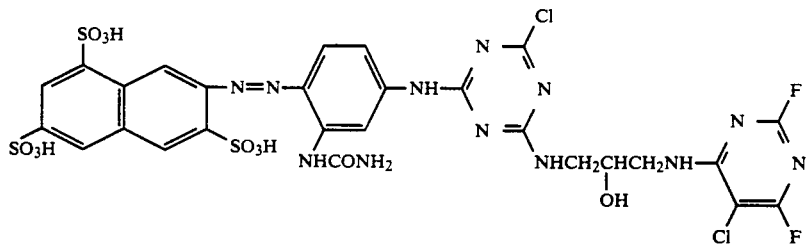

is obtained which dyes cotton an orange shade. The dyeings and prints on cotton obtained in accordance with conventional methods, and particularly those printings obtained in combination with naphthol AS dyes, show good wet fastness properties and good light fastness (dry and especially wet); furthermore, they are resistant to oxidative influences.

EXAMPLE 2

If in step b) of Example 1 3.3 parts of 1,2-diaminopropane are used instead of 4parts of 1,3-diamino-2-propanol, and the reaction temperature is elevated to 48°-50° within one hour, the dyestuff having the formula

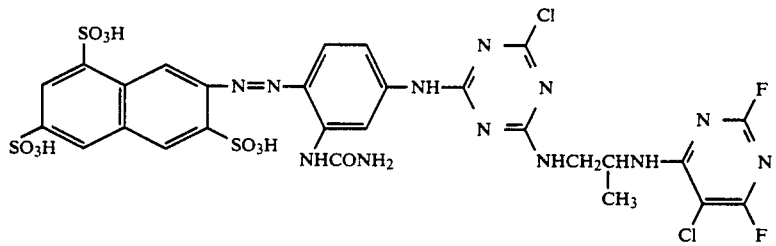

is obtained it dyes cotton an orange shade. These dyeings and prints on cotton show good wet fastness properties and remarkably good dry and wet light fastness properties. Furthermore, they are resistant to oxidative influences.

EXAMPLES 3 to 41

By analogy with the method described in Example 1 or 2, using appropriate starting compounds, further compounds of formula I may be prepared which are listed in the following Table. They correspond to formula I in which each $R_3$ is hydrogen and the other symbols are as defined in the Table.

Any marked nitrogen atom in the definition of —W— is bound to the carbon atom of the triazine ring.

The compounds of Examples 3 to 41 may be applied to substrates containing or consisting of cellulose fibres, particularly to cotton fabrics, according to the conventional exhaust dyeing method or printing processes, where dyeings and prints of a yellow to orange shade are obtained. The dyeings and prints on cotton, particularly those prints obtained from combination with naphthol AS dyes, show good wet fastness properties and are resistant to oxidative influences. Furthermore, they have good light fastness properties of which the high wet light fastness is especially to be noted.

In the last column of the following Table the shade of each cotton dyeing is given whereby
a is yellow,
b is yellowish-orange, and
c is orange.

TABLE

| Ex. No. | azo group in position | SO$_3$H in position | R$_1$ | R$_2$ | —W— | shade on cotton |
|---|---|---|---|---|---|---|
| 3 | 1 | 3 | H | —NHCONH$_2$ | —*NHCH$_2$CHNH— <br> \| <br> CH$_3$ | c |
| 4 | 2 | 4 | H | " | " | c |
| 5 | 2 | 3 | H | H | " | a |
| 6 | 1 | 3 | H | H | " | a |
| 7 | 2 | 3 | H | —NHCOCH$_3$ | " | b |
| 8 | 1 | 3 | H | " | " | b |
| 9 | 2 | 3 | H | CH$_3$ | " | a |
| 10 | 2 | 3 | OCH$_3$ | H | " | a |
| 11 | 2 | 4 | H | —NHCONH$_2$ | —NHCH$_2$CHCH$_2$NH— <br> \| <br> OH | c |
| 12 | 1 | 3 | H | " | " | c |
| 13 | 2 | 3 | H | CH$_3$ | " | a |
| 14 | 2 | 4 | H | " | " | a |
| 15 | 1 | 3 | H | " | " | a |

TABLE-continued

| Ex. No. | azo group in position | SO$_3$H in position | R$_1$ | R$_2$ | —W— | shade on cotton |
|---|---|---|---|---|---|---|
| 16 | 2 | 3 | H | H | " | a |
| 17 | 2 | 3 | CH$_3$ | CH$_3$ | " | a |
| 18 | 2 | 4 | OCH$_3$ | H | " | a |
| 19 | 2 | 3 | H | —NHCOCH$_3$ | " | b |
| 20 | 1 | 3 | H | " | " | b |
| 21 | 2 | 3 | H | —NHCONH$_2$ | —NHCH$_2$CH$_2$NH— | c |
| 22 | 2 | 4 | H | " | " | c |
| 23 | 1 | 3 | H | " | " | c |
| 24 | 2 | 3 | H | CH$_3$ | " | a |
| 25 | 2 | 3 | H | H | " | a |
| 26 | 2 | 4 | H | H | " | a |
| 27 | 2 | 3 | H | —NHCONH$_2$ | —NHCH$_2$CH$_2$CH$_2$NH— | c |
| 28 | 2 | 3 | H | —NHCONH$_2$ | 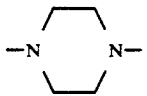 | c |
| 29 | 1 | 3 | H | " | " | c |
| 30 | 2 | 4 | H | CH$_3$ | " | a |
| 31 | 2 | 3 | H | " | " | a |
| 32 | 2 | 3 | H | —NHCOCH$_3$ | " | b |
| 33 | 2 | 3 | H | H | " | a |
| 34 | 1 | 3 | H | H | " | a |
| 35 | 2 | 3 | H | —NHCONH$_2$ | 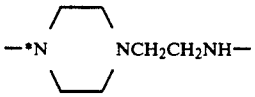 | c |
| 36 | 2 | 3 | H | —NHCOCH$_3$ | " | b |
| 37 | 2 | 4 | H | " | " | b |
| 38 | 1 | 3 | H | " | " | b |
| 39 | 2 | 3 | H | H | " | a |
| 40 | 2 | 4 | H | CH$_3$ | " | a |
| 41 | 2 | 4 | H | H | 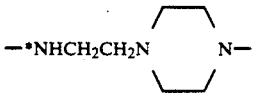 | a |

In accordance with the method as described the dyestuffs of Examples 1 to 41 are obtained in sodium salt form. They may, depending on the reaction/isolation conditions or by reacting the sodium salts in accordance with known methods, also be obtained in free acid form or in other salt forms, for example those salt forms containing one or more cations indicated in the description above.

In the following examples the application of the compounds of this invention is illustrated.

APPLICATION EXAMPLE A

Exhaust Dyeing 0.3 Parts of the dyestuff of Example 1 or 2 are dissolved in 300 parts of demineralised water and 15 parts of Glauber's salt (calcined) are added. The dyebath is heated to 40°, then 10 parts of cotton fabric (bleached) are added. After 30 minutes at 40°, 6 parts of sodium carbonate (calcined) are added to the bath portionwise every 10 minutes applying quantities of 0.2, 0.6, 1.2 and finally 4.0 parts thereof. During the addition of sodium carbonate the temperature is kept at 40°. Subsequently, dyeing is effected for a further one hour at 40°.

The dyed fabric is then rinsed with running cold water for 3 minutes and afterwards with running hot water for a further 3 minutes. The dyeing is washed at the boil for 15 minutes in 500 parts of demineralised water in the presence of 0.25 parts of a commercially available anion-active detergent. After rinsing with running hot water (for 3 minutes) and centrifuging, the dyeing is dried in a cabinet dryer at ca. 70°. An orange cotton dyeing (for each dyestuff) is obtained which shows good light fastness (particularly for the wet dyeing) and wet fastness properties and which is resistant to oxidative influences.

APPLICATION EXAMPLE B

Printing

A printing paste consisting of

| | |
|---|---|
| 40 | parts of the dyestuff of Example 1 or 2 |
| 100 | parts of urea |
| 340 | parts of water |
| 500 | parts of a 4% sodium alginate thickener and |
| 20 | parts of sodium carbonate |
| 1000 | parts | is applied to cotton fabric in accordance with a conventional printing method.

The printed fabric is dried and fixed in steam at 105° for one minute. It is then rinsed in hot water, washed at the boil (according to the method described in Application Example A) and dried. An orange print is obtained for each of the used dyestuffs which has a good general fastness properties and is stable to oxidative influences.

APPLICATION EXAMPLE C

Naphthol As Print

A printing paste according to application Example B is applied to cotton cretonne (leached) which fabric has been primed using a naphthol As dye prior to printing. Printing is effected in accordance with a conventional printing process. The thus obtained prints on cotton show notably good light fastness properties.

Similarly, the dyestuffs of the other examples or mixtures of the dyestuffs of Examples 1 to 41 may be employed to dye or print cotton in accordance with the methods given in Application Examples A to C.

What is claimed is:

1. The compound of the formula

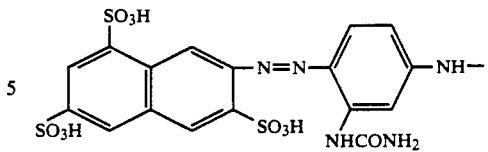
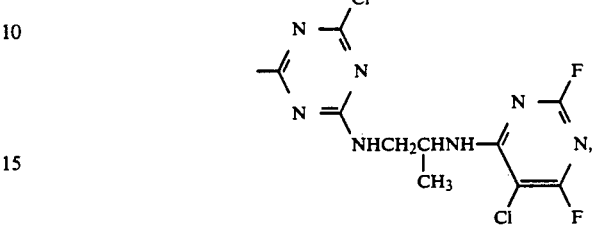

or a water-soluble salt thereof each cation of which is independently a non-chromophoric cation.

2. The compound according to claim 1 in sodium salt form.

* * * * *